T. J. Mayall,
Working Rattan.
No. 36,058. Patented July 29, 1862.
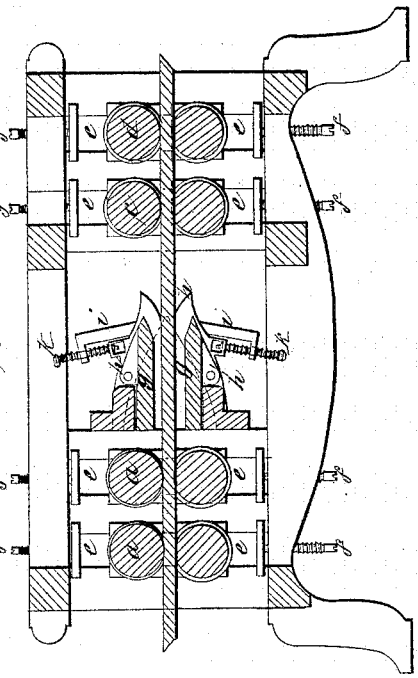
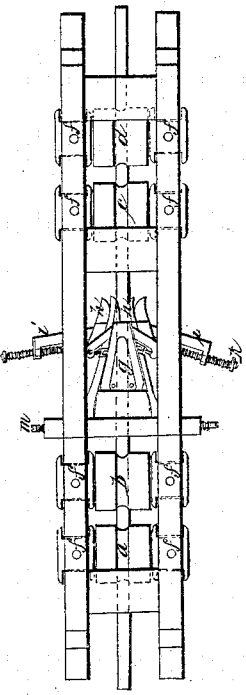
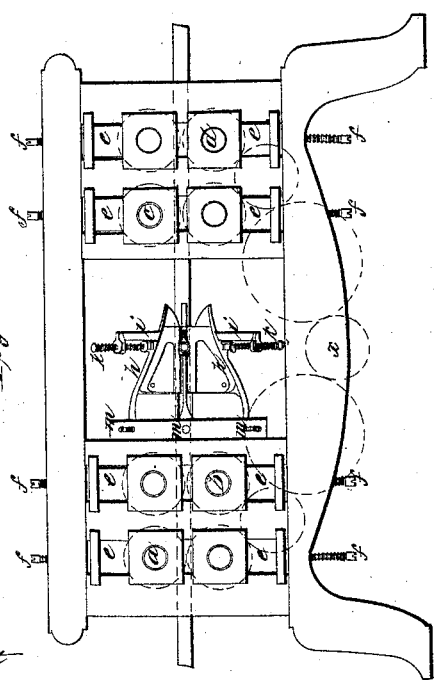
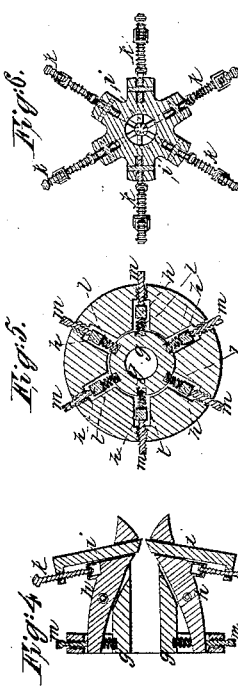
Witnesses:
Joseph Gavett
Albert N. Dunn
Inventor:
Thos. J. Mayall

UNITED STATES PATENT OFFICE.

THOMAS J. MAYALL, OF BOSTON, ASSIGNOR TO CYRUS WAKEFIELD, OF SOUTH READING, MASSACHUSETTS.

IMPROVEMENT IN RATTAN MACHINERY.

Specification forming part of Letters Patent No. 36,058, dated July 29, 1862.

*To all whom it may concern:*

Be it known that I, THOMAS J. MAYALL, of Boston, in the county of Suffolk and State of Massachusetts, have invented certain new and useful Improvements in Machinery for Cutting Rattan; and I do hereby declare the following to be a full, clear, and exact description of the same, reference being had to the accompanying drawings and the letters of reference marked thereon.

The object of this invention is to divide and cut the surface of rattan into longitudinal sections or strips that may be subsequently separated from the core to form strands or braids for seating chairs and for other purposes; and it consists in the employment of a series of peculiarly-formed knives that cut into the surface of the stick of rattan to the depth required for the thickness of the strand while the stick of rattan is being carried through the machine by suitable feed-rollers covered with india rubber, that enables them to grasp the rattan firmly without injuring its silicious surface.

To enable others skilled in the art to make and use my invention, I will proceed to describe its construction and operation.

Figure 1 of the drawings is a side elevation of my improved machine. Fig. 2 is a longitudinal section, and Fig. 3 is a plan, of the same. Figs. 4, 5, and 6 are detached views of portions of the machine that will be hereinafter more particularly described.

The stick of rattan represented in the drawings is grasped by the pairs of rollers $a$, $b$, $c$, and $d$, which are furnished with grooves in the middle of their length for its reception, and are covered with india-rubber, that the stick may be firmly and securely held without bruising or crushing its surface. Each pair of these rollers has blocks of india-rubber, $e$ $e$, placed above and below their journals, so that the rollers will yield uniformly to any variation of the size of stick and retain it in its proper central and rectilinear position in the machine. The journals also have regulating-screws $f$, bearing upon the blocks of india-rubber, with a plate interposed for the purpose of adjusting the rollers to the different diameters of rattans and to any desired pressure. A similar office may be performed by replacing the india-rubber and regulating-screws with metal springs and set-screws. It will be found that the extent of this adjustment will not be sufficient to interfere with the action of the gear-wheels, by which the rollers are rotated from the driving-shaft $x$.

The "cutter-head," or the part of the machine containing the cutting-knives, is secured to the frame in the middle of the machine, and is represented detached in Figs. 4, 5, and 6. It consists of a flanged sleeve, to which a series of levers, $h$, are pivoted in the middle of their length or thereabout. One end of each of these levers is mortised for the reception of a knife, $i$, the projection of the cutting end of which is regulated by the screws $k$. The other ends of the levers $h$ are inserted in openings in the flange of the sleeve $g$, and are pressed outward by springs $l$ and are depressed by screws $m$. The stick of rattan is thrust between the flared knife ends of the levers $h$ and into the sleeve $g$. The springs $l$ depress the ends of the levers to bear upon the rattan, against the surface of which they may be adjusted by the screws $m$. The screws $k$ are then adjusted to cause the cutting-edge of the knife to enter the rattan to the required depth. Instead of having adjustable knives working through mortises in the levers, as has been described, the levers may be furnished with permanent knife edges or points projecting from their interior edges.

The frame of the machine and the gearing by which it is driven may be arranged in any suitable manner; but the arrangement I prefer is illustrated in the drawings.

In operating my improved machine, the end of the stick of rattan is first entered in the grooves between the pairs of rollers $a$, $b$, $c$, and $d$, which are adjusted by the screws $f$ to retain it in a central position and to grasp it firmly. The elasticity of the india-rubber covering of the rollers will cause it to be securely held without incurring the risk of injuring its surface, and to be fed and transferred uniformly without the jerkings and slippings incident to any inequalities of surface with ordinary inelastic rollers, and the blocks of india-rubber $e$, above and below the journals, will enable the rollers to yield to any ordinary variation of diameter without altering the central position of the stick. The knives are then adjusted by the screws $k$ and $m$ to cut into the surface of the rattan to the depth required for the strand. The machine is then set in motion by the application of power to the driving-shaft x, which rotates the feed-rollers and causes the stick to be drawn through the machine and to be cut or scored by the action of the knives in the manner desired. Six knives are represented in the drawings operating upon a stick of rattan; but it is evident that any number may be used without departing from the nature of my invention. The strands that have thus been marked and scored on the surface of the rattan may be subsequently separated from the core with a tubular cutter, or in any other manner that may be convenient.

It will be observed that the knives operate from the outside and cut upon and through the brittle surface of the rattan while it is supported by the internal core, which causes them to make a cleaner cut than could be obtained by any of the machines hitherto used, in which the point of the cutter is inserted under the surface and the cutting-edge operated toward the surface, and thus causes the unsupported enamel to be irregularly fractured at the edge of the strand. By this machine, therefore, in which the surface is cut by external knives acting toward the center of the stick, an important economy of both labor and material is effected, which would otherwise be lost in dressing and trimming the strand.

Having thus described my improvements, what I claim as my invention, and desire to have secured to me by Letters Patent, is—

The apparatus herein described for dividing the surface of rattan into longitudinal sections previous to the said sections being separated from the core to form strands for chair-seating and other purposes, the same consisting of a cluster of lancet-knives, in combination with and protruding from the cam-faces of self-adjusting levers, the whole being constructed and arranged, in relation to a suitable rattan-feeding mechanism, to operate substantially as herein shown and set forth.

THOS. J. MAYALL.

Witnesses:
A. POLLAK,
WM. H. HARRISON.